July 2, 1935.  H. J. BURNISH  2,006,581
MANDREL FOR ELECTRIC WELDING MACHINES
Filed March 9, 1932
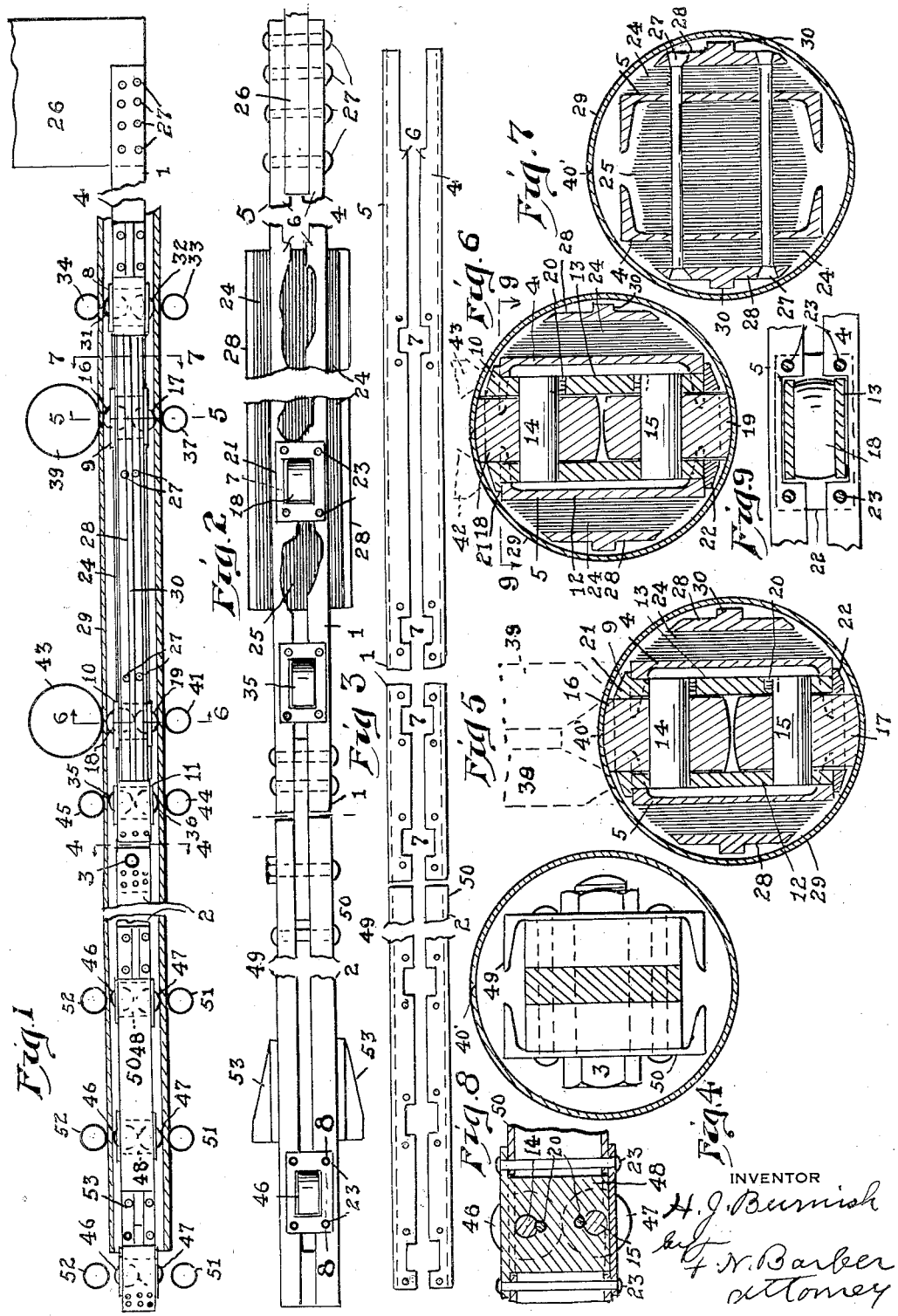
INVENTOR
H. J. Burnish
By F. N. Barber
Attorney Patented July 2, 1935

2,006,581

UNITED STATES PATENT OFFICE 2,006,581

MANDREL FOR ELECTRIC WELDING MACHINES

Howard J. Burnish, Sewickley, Pa., assignor to Spang, Chalfant & Co., Inc., Pittsburgh, Pa., a corporation of Pennsylvania Application March 9, 1932, Serial No. 597,698

3 Claims. (Cl. 219—6)

This invention relates to mandrels for use in electric welding machines which are adapted to progressively weld the longitudinal seams of tubes and in which fixed mandrels are supported so as to permit the tubes to envelope or telescope them as the tubes pass through the welding machine in contact with alternating current electrodes at opposite sides of the seam or lap.

One object is to provide a substantial mandrel for supporting the tube at the several stations where it is subjected to relatively high external pressures during the welding process.

Another object is to provide in the vicinity of the stations at which the welding and the reheating of the tube takes place, a mandrel having thin laminations insulated from one another and arranged longitudinally of the mandrel, it being permissible to have the laminations vertical or horizontal or at any angle between the vertical and the horizontal. I have found that such a laminated mandrel permits continued operation without destructive heating thereof which quickly results with unlaminated or solid mandrels. The laminated construction of the mandrels reduces stray or eddy current losses which, when allowed to flow freely as in unlaminated or solid mandrels, rapidly causes their overheating and destruction.

I prefer to make the mandrel of articulated sections to permit it to adjust itself to any bending or bowing of the tube as it passes over the mandrel.

Referring to the accompanying drawing, Fig. 1 is in part a diagrammatic representation in side elevation of my invention as it would appear during the welding of a tube, the latter being in longitudinal section and parts of the mandrel being broken away.

Fig. 2 is a plan view of the mandrel, the scale being enlarged as compared with that of Fig. 1, and parts being broken away.

Fig. 3 is a plan view of the opposing channel bars which support the remaining parts of the mandrel.

Figs. 4, 5, 6, 7, and 8 are respectively sections on the lines 4—4, 5—5, 6—6, 7—7, and 8—8 on Fig. 1, the rollers and electrodes shown on the upper and lower side of Fig. 1 being omitted.

Fig. 9 is a section on the line 9—9 on Fig. 6.

My mandrel is composed of two tandem lengths or sections 1 and 2 hinged together by the horizontal or transverse pin 3, only a limited degree of oscillation on the pin being permitted as the opposing squared ends of the two sections are separated but slightly.

Section 1 will now be described. It has two parallel steel channel bars 4 and 5 with their channeled faces opposing each other. They extend from one end of section 1 to the other and have their flanges 6 opposed and slightly spaced apart. The opposed edges of the flanges 6 have open opposed notches 7 in which housings for supporting rollers are mounted. There are four of these housing which are marked respectively 8, 9, 10 and 11, being indicated in Fig. 1 by dotted lines, while the housings 9 and 10 are shown in transverse section on an enlarged scale in Figs. 5 and 6. The housings are alike. Referring now to Figs. 5 and 6, 12 and 13 are two vertical side members arranged opposite each other. These members are provided with two horizontal parallel axles or bearings 14 and 15, the former being directly above the latter and lying transversely of the bars 4 and 5. In Fig. 5, rollers 16 and 17 are mounted on the respective bearings 14 and 15, and in Fig. 6, rollers 18 and 19 are mounted on the respective bearings 14 and 15. The bearings are held in place by the screws 20 screwed partly in the members 13 and partly in the bearings 14 and 15. The members 12 and 13 having been assembled with the rollers on their bearings are let down in the opposed notches 7 and rest on the upper edges of the bars 4 and 5 by means of the cap plate 21 on the upper ends of the members 12 and 13. A cap plate 22 fits up against the lower ends of the members 12 and 13 and engages the lower edges of the bars 4 and 5. Bolts or rivets 23 extend down through the cap plates and housings and unite each housing into a rigid connection with the bars 4 and 5. The rollers 16 and 18 project through and above the cap plates 21 and the rollers 17 and 19 project through and below the cap plates 22.

The outer faces of the bars 4 and 5 have applied thereto a series of thin steel laminations 24 all parallel with the bars and preferably extending from the housing 8 to the housing 11. Similar laminations 25 are arranged between the bars 4 and 5 and between their flanges 6. The laminations 25 preferably extend from the housing 8 to the housing 9, from the latter housing to the housing 10, and from the latter housing to the housing 11. The outermost laminations 24 at the sides of the mandrel have applied thereto the steel bars 28 which are held in clamping relation to the included bars 4 and 5 and the laminations 24 and 25 by the rivets 27. The bars 28 are externally shaped to guide the formed tube 29 along the mandrel, the bars 28 having the longitudinal ribs 30 for that purpose. The bars 28 also protect the outer laminations from abrasion with the tubes.

The rear end of the section 1 has the vertical anchor plate or bar 26, having its lower end between the bars 4 and 5 and secured thereto by rivets 27. The upper end of the anchor plate is shown broken off, but it is to be secured to a fixed support. As anchors for mandrels are well known, no further description thereof is offered.

The tubular skelp or formed tube 29 has its longitudinal edges lapped one over the other and designed to be welded together. The formed tube is pushed longitudinally by any suitable apparatus so as to be passed telescopically over the mandrel, the anchor plate 26 standing between the open edges of the tube as the tube travels to the left. The tube is treated at four stations corresponding to the positions of the rollers supported in the said four housings 8, 9, 10 and 11. When the tube reaches the first station, it telescopes or passes over the two rollers 31 and 32 carried by the housing 8. The tube rides on the roller 33 directly below the roller 32, and also rides under the roller 34 directly over the roller 31. At this first station the lapped edges of the formed tube 29 are pressed tightly together between the rollers 31 and 34 to cause the mutually-engaged surfaces of the said edges to be brought into accurate engagement throughout the overlap.

When the tube reaches the second station corresponding to the positions of the two rollers 16 and 17 which are supported in the housing 9, it telescopes over the said two rollers and rides on the roller 37 directly under the roller 17. At the same time the upper side of the tube 29 rides beneath the welding electrodes 38 and 39, arranged in spaced relation with each other and engaging the pipe 29 at opposite sides of the seam or overlap 40', the electrodes being directly over the roller 16. I prefer that the electrodes be constructed and arranged as shown and described in my application Serial Number 562,079, filed September 10, 1931. At the second station, high amperage alternating welding current passes from one electrode to the other through the intervening seam or lap portions of the tube, causing them to become welded together.

When the pipe reaches the third station, it passes over the rollers 18 and 19 and travels on the roller 41 directly beneath the roller 19. It passes beneath the reheating electrodes 42 and 43, constructed and operating like the welding electrodes 38 and 39 except that the metal at the reheating or third station is not heated to so high a degree as at the welding or second station.

When the pipe reaches the fourth station, it passes over the rollers 35 and 36 and upon the roller 44 directly below the roller 36. At the same time the upper side of the tube along the seam passes under the roller 45 which is directly over the roller 35. Here mechanical work is performed on the heated portions of the pipe by the rollers 35 and 45, the work preferably stopping at the critical range.

The treatment of the pipe at the four stations so far described forms no part of the present invention, but is fully shown and described in my application Serial Number 567,378, filed October 7, 1931.

I prefer to employ the welding apparatus shown and described in my application Serial Number 566,469, filed October 2, 1931.

From the fourth station the pipe is fed through sets of ironing rolls, each set forming a throat through which the pipe passes. Each set has two horizontal rollers 46 and 47 carried by the section 2 of the mandrel. These rollers are carried by housings 48 like the housings shown in Figs. 5 and 6, the housings being supported by the bars 49 and 50 like the bars 4 and 5. The pipe rides on the rollers 51 directly under the rollers 47. It rides also in contact with the rollers 52 directly over the rollers 46. These ironing rolls are fully shown in my said application Serial Number 567,378. In addition to the rollers shown and described there may be horizontal rollers bearing against the sides of the pipe 90° from the seam, all as shown in the application last named, but forming no part of the present invention.

When a mandrel having an unlaminated or solid core is employed, it is subjected to destructive heating opposite the electrodes 38—39 and 42—43, but when a mandrel with a laminated core is used, the life of the mandrel is very greatly extended, since the mandrel is operated at a decidedly lower temperature, the reason being that the laminated structure, approximately filling the tube on each side of the electrodes, has an impedance effect resisting the flow of current around the pipe. It also concentrates the intensive magnetic field of the actual welding current, thus causing the current to increase for a given potential of the electrodes at the point of welding which increase of concentrated energy increases the temperature thereof. This increase of temperature at the point of welding decreases the amount of electrical energy required to weld a given size of tubing at the same rate of speed, or for the same amount of electrical energy and a given size of tubing the speed of welding may be increased. As shown on the drawing, the laminations are built around the mandrel at positions which will be in close proximity to the point of welding when the mandrel is positioned in the welding machine for which it is designed.

I have illustrated my invention adapted to weld longitudinal seams on the upper sides of tubular skelp or formed tubes, such being the usual practise. I have shown the laminations vertical, but it is to be understood that they may be vertical or horizontal or at any angle therebetween. As I have shown vertical laminations I will offer the following in part at least as an explanation of how such laminations reduce eddy current losses as compared with the losses in solid unlaminated mandrels.

When the welding or reheating current passes from one electrode to the other, the intervening portions of the tube form an electric conductor carrying high amperage alternating current. Current flows alternately in the opposite directions therein and forms strong magnetic fields whose lines of force or direction of travel are at right angles with the conductor. When these alternating fields cut across a solid or one-piece core in the mandrel, strong eddy currents are set up which, having unobstructed circuits, rapidly and severely heat the core and soon cause its destruction.

In the present mandrel the magnetic field circulates in the mandrel parallel with the laminations and tends to set up eddy currents flowing transversely of the laminations. However, the laminations are so thin and their insulation from each other is so effective that eddy current flow is greatly reduced, as those acquainted with the art treated herein will readily understand, the reduction of eddy and other stray currents being so pronounced that my laminated mandrels will continue in operation at decidedly lower temperature and for decidedly longer periods than is possible with mandrels with solid or unlaminated cores.

It will be obvious to those acquainted with the electrical art that eddy current losses will be largely eliminated no matter at what angle the laminations are disposed radially with respect to the axial center of the mandrel or tube being treated. In fact, this invention secures the described advantages when an apparatus is made and operated according to the principles herein set forth, irrespective of theoretic speculation or analysis of the reasons why such advantages are secured.

The laminations will be insulated from each other in any satisfactory manner.

The mandrel has tapered guides 53 on the sides of the mandrel to engage diametrically opposite sides of the tube and maintain the tube in axial alinement with the longitudinal axis of the mandrel.

The pivot pin 3 provides flexibility of the mandrel so that it can yield to deflections or variations in the axial alinement of the tube structure, as it advances through the apparatus.

What is claimed is,

1. In a mandrel for supporting a metal tube during the welding of a longitudinal seam thereof, a pair of spaced-apart channel bars arranged longitudinally of the mandrel and having their channeled faces opposed to each other and their flanges provided with notches opposed to each other, a pair of spaced-apart housing members in the notches, a cap plate lying on the upper faces of the upper flanges of the bars and arranged to prevent the housing members from upward movement, a cap plate on the lower faces of the lower flanges of the bars to prevent the downward movement of the housing members, means for securing the cap plates to the channel bars, a pair of horizontal axles mounted one over the other in the housing members, and a roller mounted on each axle, one projecting through the upper cap plate and the other down through the lower cap plate.

2. In a mandrel for supporting a longitudinally-traveling tube during the welding of a longitudinal seam thereof by alternating current flowing across the seam and between electrodes positioned on the tube and at opposite sides of the seam, parallel spaced bars extending longitudinally of the mandrel, rollers supported by and between the bars and adapted to contact with the inner surface of the tube opposite the seam, and thin laminations supported by the bars and extending longitudinally of the mandrel, there being laminations positioned between the bars and at the outer sides thereof and arranged to be cut by the alternating flux generated by the said alternating current flowing between the electrodes to reduce eddy current losses, in combination with metal plates arranged longitudinally of the mandrel and applied to the outer faces of the outermost of the laminations at the outer sides of the bars, and means for securing the bars, the plates and the laminations into a rigid structure, the plates being arranged to engage the inner surface of the tube to center the latter on the mandrel.

3. In a mandrel for supporting a metal tube during the welding of a longitudinal seam thereof, two spaced-apart bars arranged longitudinally of the mandrel, a series of superimposed laminations at the outer side of each bar, the laminations being of gradually diminishing widths outwardly from the bars, a plate positioned on the outer face of each series of laminations and extending longitudinally of the mandrel and having a guide rib at its outer face for engaging and centering a tube passing over the mandrel, laminations positioned between the bars and arranged longitudinally of the mandrel, and means for securing the bars, the plates and the laminations into a rigid structure.

HOWARD J. BURNISH.